(12) United States Patent
Tripathy et al.

(10) Patent No.: US 11,880,835 B2
(45) Date of Patent: Jan. 23, 2024

(54) PREVENTION OF DUPLICATE TRANSACTIONS ACROSS MULTIPLE TRANSACTION ENTITIES IN DATABASE SYSTEMS

(71) Applicant: Salesforce, Inc., San Francisco, CA (US)

(72) Inventors: Manasa Ranjan Tripathy, Telangana (IN); Tarundeep Batra, Union City, CA (US); Ravi Shankar, Telangana (IN)

(73) Assignee: Salesforce, Inc., San Francisco, CA (US)

( * ) Notice: Subject to any disclaimer, the term of this patent is extended or adjusted under 35 U.S.C. 154(b) by 427 days.

(21) Appl. No.: 16/915,680

(22) Filed: Jun. 29, 2020

(65) Prior Publication Data

US 2021/0365935 A1    Nov. 25, 2021

(30) Foreign Application Priority Data

Apr. 24, 2020 (IN) .............................. 202041017588

(51) Int. Cl.

| | |
|---|---|
| *G06Q 20/38* | (2012.01) |
| *G06F 11/07* | (2006.01) |
| *G06Q 20/40* | (2012.01) |
| *G06F 11/14* | (2006.01) |
| *G06Q 20/42* | (2012.01) |

(52) U.S. Cl.
CPC ......... *G06Q 20/389* (2013.01); *G06F 11/079* (2013.01); *G06F 11/1402* (2013.01); *G06Q 20/3829* (2013.01); *G06Q 20/4093* (2013.01); *G06Q 20/425* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

*Primary Examiner* — Neha Patel
*Assistant Examiner* — Nicholas K Phan
(74) *Attorney, Agent, or Firm* — Kwan & Olynick LLP

(57) ABSTRACT

In accordance with embodiments, there are provided mechanisms and methods for facilitating prevention of duplicate transactions across multiple transaction entities in database systems according to one embodiment. In one embodiment and by way of example, a method includes receiving a request to facilitate a financial transaction, wherein the request is received from an external computing device and includes an idempotency key that is unique to the request, and verifying, based on the idempotency key, the request as being a valid request or an invalid request, wherein the valid request is registered, and classifying, based on the idempotency key and a gateway log, the valid request as an original request or a duplicate request that is a successful duplicate request or an unsuccessful duplicate request.

19 Claims, 8 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Formukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 10,445,322 B1* | 10/2019 | Kommera ............... G06F 16/23 |
| 10,778,660 B1* | 9/2020 | Rajaram ................. H04L 67/63 |
| 11,475,440 B2* | 10/2022 | Nichani ............... G06Q 20/389 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2010/0257140 A1* | 10/2010 | Davis ................ G06F 16/113 707/661 |
| 2011/0320347 A1* | 12/2011 | Tumminaro ....... G06Q 20/0855 705/39 |
| 2019/0171512 A1* | 6/2019 | Petrini ................. G06F 11/079 |
| 2019/0236487 A1* | 8/2019 | Huang ................. G06N 20/00 |
| 2020/0051019 A1* | 2/2020 | Kamani ................ H04L 51/046 |
| 2021/0320908 A1* | 10/2021 | Jain ........................ H04L 67/12 |

\* cited by examiner

PREVENTION OF DUPLICATE TRANSACTIONS ACROSS MULTIPLE TRANSACTION ENTITIES IN DATABASE SYSTEMS

CROSS-REFERENCE

This patent application is related to and, under 35 U.S.C. 119, claims the benefit of and priority to India Provisional Patent Application No. 202041017588, entitled MULTI-LAYER IDEMPOTENCY TO AVOID UNINTENTIONAL MULTIPLE PAYMENTS IN DATABASE SYSTEMS, by Manasa Ranjan Tripathy, et al., filed Apr. 24, 2020, where the contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management; more specifically, to facilitate prevention of duplicate transactions across multiple transaction entities in database systems.

BACKGROUND

Conventional data management technique lack proper management of transactional data often leading to multiple charging of credit cards, debit cards, gift cards, etc.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
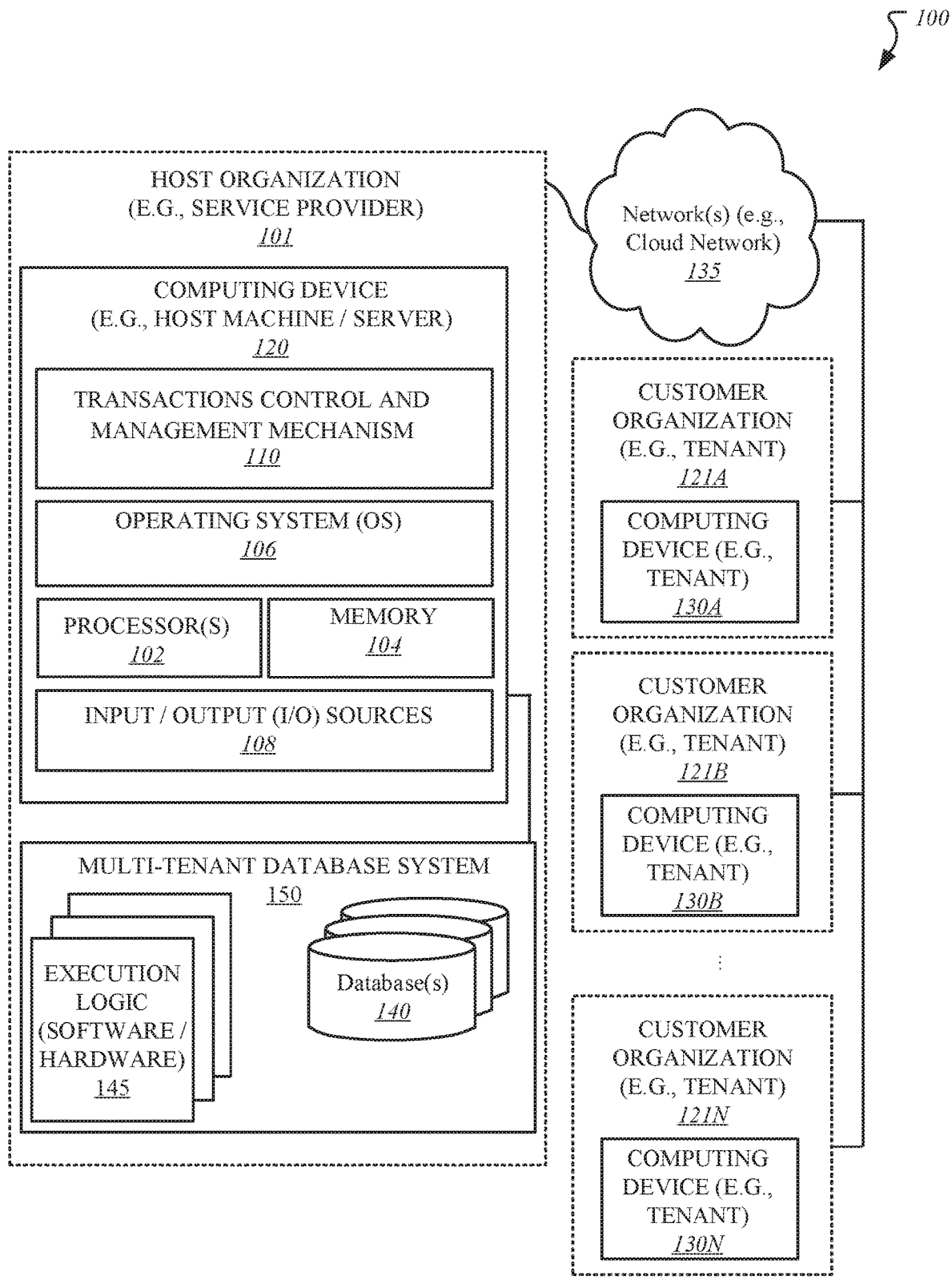
FIG. 1 illustrates a system having a computing device employing a transactions control and management mechanism according to one embodiment.

In accordance with embodiments, there are provided mechanisms and methods for facilitating prevention of duplicate transactions across multiple transaction entities in database systems according to one embodiment. In one embodiment and by way of example, a method includes receiving a request to facilitate a financial transaction, where the request is received from an external computing device and includes an idempotency key that is unique to the request, and verifying, based on the idempotency key, the request as being a valid request or an invalid request, where the valid request is registered. The method may further include classifying, based on the idempotency key and a gateway log, the valid request as an original request or a duplicate request that is a successful duplicate request or an unsuccessful duplicate request, where the successful duplicate request is duplicate to a first previous request that was previously successfully processed, and where the unsuccessful duplicate request is duplicate to a second previous request that was previously unsuccessfully processed, and if the request is classified as the successful duplicate request, executing the request by communicating, to the external computing device, a previous response associated with the first previous request.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

In the following description, numerous specific details are set forth. However, embodiments of the invention may be practiced without these specific details. In other instances, well-known circuits, structures, and techniques have not been shown in detail in order not to obscure the understanding of this description.

Embodiments provide for a technique for facilitating prevention of duplicate transactions across multiple transaction entities in database systems. In one embodiment, this prevention of duplication may be ensured through multi-layer idempotency, while these transactions may include financial transactions of any type of personal and/or business transactions using one or more of personal credit cards, merchant credit cards, debit cards, gift cards, etc.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a transactions control and management mechanism 110 according to one embodiment. In one embodiment, transactions control and management mechanism 110 provides for a technique for facilitating prevention of duplication of financial transactions based on idempotency in database systems.

As illustrated, in one embodiment, computing device 120, being part of host organization 101 (e.g., service provider, such as Salesforce.com®), represents or includes a server computer acting as a host machine for transactions control and management mechanism 110 for facilitating creating and using an intelligent data-loader for facilitating efficient bulk loading/inserting of data records in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A, 121B, 121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of transactions control and management mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitations) one or more of tenants or customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitations) server computers (e.g., cloud server computers, etc.), desktop computers, cluster-based computers, set-top boxes (e.g., Internet-based cable television set-top boxes, etc.), etc. Computing device 120 includes an operating system ("OS")

106 serving as an interface between one or more hardware/physical resources of computing device 120 and one or more client devices 130A, 130B, 130N, etc. Computing device 120 further includes processor(s) 102, memory 104, input/output ("I/O") sources 108, such as touchscreens, touch panels, touch pads, virtual or regular keyboards, virtual or regular mice, etc. Client devices 130A-130N may be regarded as external computing devices.

In one embodiment, host organization 101 may employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc. In some embodiments, client devices 130A-include artificially intelligent devices, such as autonomous machines including (without limitations) one or more of autonomous vehicles, drones, robots, smart household appliances, smart equipment, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 140 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Management ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
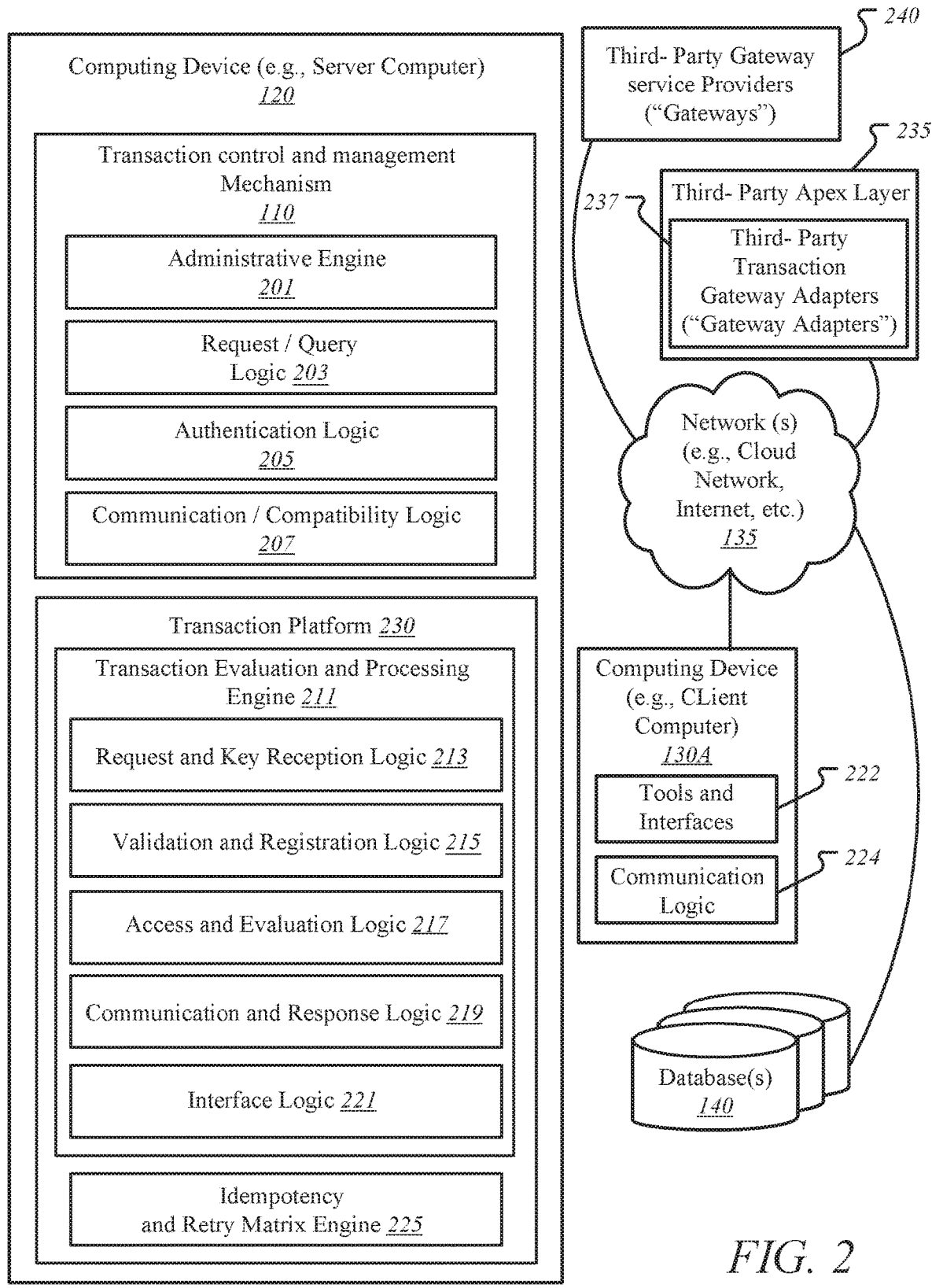
FIG. 2 illustrates the transactions control and management mechanism of FIG. 1 according to one embodiment.

FIG. 2 illustrates transactions control and management mechanism 110 of FIG. 1 according to one embodiment. In one embodiment, transactions control and management mechanism 110 provides for facilitating control and management of financial transactions so that any potential duplications of such transactions are detected, analyzed, and avoided when communicating with multiple transaction entities, such as transaction gateways, transaction gateway adapters, etc. Further, such transactions may be associated with users and/or tenants (e.g., organizations) and include financial transactions, in multi-tenant database systems, where transactions control and management mechanism 110 includes any number and type of components, such as administration engine 201 having (without limitation): request/query logic 203; authentication logic 205; and communication/compatibility logic 207. Similarly, transactions control and management mechanism 110 may further include transaction evaluation and processing engine 211 including (without limitations): request and key reception logic 213; validation and registration logic 215; access and evaluation logic 217; communication and response logic 219; and interface logic 221. As further illustrated, transaction control and management mechanism 110 may further include idempotency and retry matrix engine 225 in communication with transaction evaluation and processing engine 211.

In one embodiment, computing device 120 may serve as a service provider core (e.g., Salesforce.com® core) for hosting and maintaining transactions control and management mechanism 110 and be in communication with one or more database(s) 140, client computer 130A, over one or more network(s) 135, and any number and type of dedicated nodes. In one embodiment, one or more database(s) 140 may be used to host, hold, or store data including interface details, API documentation, tool information, menus, objects, tables, code samples, HTTP client data, messages, queries, tenant and organization data, etc.

As will be further described in this document, computing device 120 serves as a data management and security server computer that offers or supports or serves as platform server (supported by a service provider, such as Salesforce.com®), such as transaction platform 230, in communication with client computing device 130A and database(s) 140 over one or more network(s) 135 (e.g., cloud network, Internet, etc.). As will be further described in this document, this transaction platform 230 may be a cloud-based transaction platform that servers as a payment platform having its own business logic core and serving as an intermediary between client devices, such as client device 130A, and server computer 120.

As illustrated, cloud-based transaction platform 230 is further in communication with third-party apex layer ("apex layer") 235 having any number and type of transaction gateway adapters 237 (e.g., payment gateway adapters) and any number and type of third-party transaction gateway service providers ("transaction gateways" or simply "gateways") 240 (e.g., payment gateways) to provide a complete nexus between one or more users having access to client device 130A and one or more gateways 240.

Figure 3:
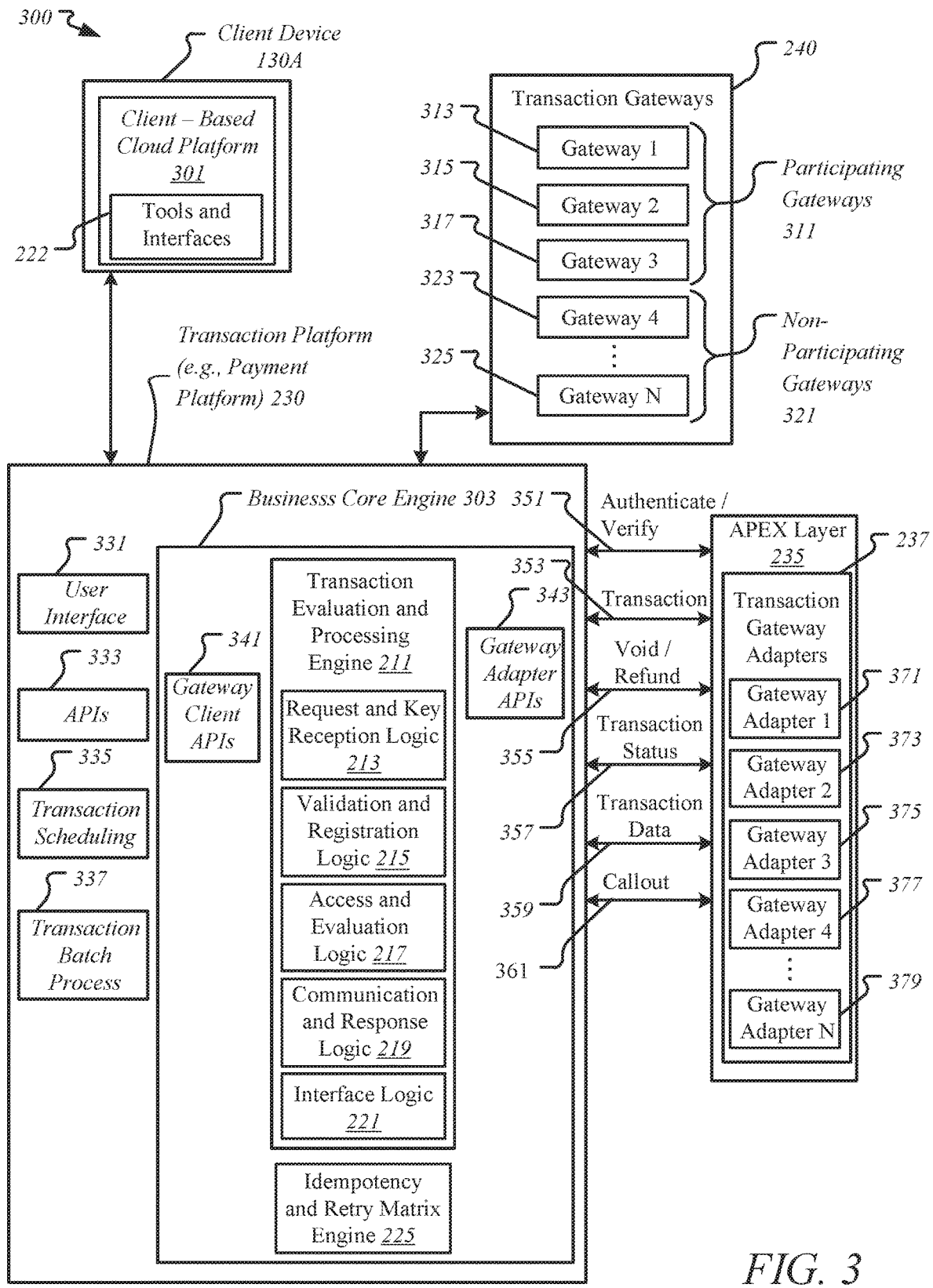
FIG. 3 illustrate an architecture to facilitate idempotency-based prevention of duplications of financial transactions according to one embodiment FIG. 4A illustrate a method for facilitating idempotency-based prevention of duplications of financial transactions according to one embodiment.

In one embodiment, transaction platform 230 may be offered as part of server computer 120, or as an extension of server computer 120, or entirely separate from but in communication with server computer 120 and as part of a service provider core (e.g., Salesforce.com® core). Further, for example, transaction platform 230 may be sufficiently flexible to be able to incorporate, integrate, or plug-in, etc., other entities, such as third-party apex later 235 and any gateway adapters 237 may be integrated with or plugged-into transaction platform 230 and be part of the service provider core. Although various architecture schemes, such as architecture 300 of FIG. 3, are discussed in this document, it is contemplated and to be noted that embodiments are not limited to any specific architectural setup or arrangement of components.

In one embodiment, client devices, such as client device 130A, allow for a user to place queries, make financial transactions (e.g., credit card transactions), access information, etc., using one or more user interfaces as facilitated by tools and interfaces 222, where the user interface may serve as a layer above and associated with API(s) provided by a service provider (e.g., Salesforce.com®). As illustrated, client device 130A is shown as employing tools and interfaces 222, and communication logic 224.

Throughout this document, terms like "framework", "mechanism", "engine", "logic", "component", "module", "tool", "builder", "circuit", and "circuitry", may be referenced interchangeably and include, by way of example, software, hardware, firmware, or any combination thereof. Further, any use of a particular brand, word, or term, such as "query", "data", "images", "videos", "product", "description", "detail", "sensitive data", "personal data", "user data", "non-sensitive data", "transactional data", "transaction", "request", "idempotency", "idempotency key", "idempotency ID", "validation", "duplication", "retry", "retriable", "non-triable", "non-retriable", "retry matrix", "encryption", "decryption", "crypto libraries", "application programming interface", "API request", "user interface", "pluggable architecture", "integration layer", "dependency", "dependency layer", "sending payment", "receiving payment", "facilitating transaction", "identifying", "detecting", "scanning", "replacing", "secure storage", "replacement service", "read and destroy", "gateway", "gateway adapter", "apex layer", "sales cloud", "code", "metadata", "business software", "application", "database servers", "metadata mapping", "database", "detecting", "gathering", "identifying", "generating", "merging", "associating", "calculating", "computing", "determining", "classifying", "application programming interface", "API", "user interface", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of client device 130A, code execution requests, and so forth.

In one embodiment, computing device 120 may implement request/query logic 203 to serve as a request/query interface via a web server or as a stand-alone interface to receive requests packets or other requests from the client device 130A. The request interface may further support the return of response packets or other replies and responses in an outgoing direction from computing device 120 to one or more client device 130A.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client device 130A.

In one embodiment, computing device 120 may include a server computer which may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client device 130A, over one or more communication mediums, such as network(s) 140.

Conventional techniques do not provide for automatic or intelligent ways for preventing or avoiding duplicate transactions in the field of financial transactions involving credit cards, debit cards, gift cards, etc., while engaging with while working with third-party entities, such as gateways 240. For example, conventional techniques do not offer the use of unique idempotency keys (also referred to as idempotency IDs (identifiers or identifications)) to help reduce or eliminate manual/human involvement. Conventional techniques are limited in their approach and weak in security and therefore they are cumbersome and prone to errors and often require developers and code teams to work on security of data.

Further, for example, using conventional techniques, it is common for a user (e.g., customer, merchant, etc.) to be charged multiple times for the same transaction, where in many such cases, the transaction inadvertently requested and performed multiple times. Some of the scenarios for such duplications of transactions include: 1) a network error, such as if a server computer goes down without fulfilling a payment request and the client computer tries or retries the same request assuming the payment was not made, this could lead to multiple charges, which can also happens if the client computer fails before persisting the response received from the server computer; 2) an accidental retry, such as because of a bug on a client computer, a user may end up clicking the pertinent button (e.g., pay button, send button, submit button, etc.) or refreshing the webpage multiple times for the same transaction; 3) a bug or a rare condition of some sort, such as on the client side, that that end up sending the same payment request, programmatically or algorithmically; and/or the like. For example, a network error could occur at any time and occasion when communicating client device 130A and transaction platform 230, or between transaction platform 230 and one or more of gateways 240, etc.

Embodiments provide for a cloud-based computing platform, such as transaction platform 230, that offers users with customer relationship management (CRM) applications and services with a native transaction platform that allowed for cloud-based interaction with transaction gateways 240. As mentioned above, transaction platform 230 may integrate any number and type of third-party entities, such as apex layer 235 and its associated gateway adapters 237, while other entities, such as gateways 240, client device 130A, database(s) 140, etc., may communicate with transaction platform 230 in a cloud-based communication environment over one or more network(s) 135.

Further, for example, pluggable gateway adapters 237, corresponding to gateways 240 (e.g., payment gateways), are cloud-based and written in a custom programming language and offered through third-party apex layer 235 (e.g., third-party apex managed package). An extensive discussion of apex layer 235, gateway adapters 237, and gateways 240 would be beyond the scope of this document. It is contemplated and to be noted that embodiments are not limited to any number or type of gateway adapters 237 or gateways 240 or their communication, arrangement, or placement with respect to any of the other entities or components of FIG. 2.

Embodiments provide for a technique for idempotency-based prevention of inadvertent duplication of transactions associated with customers/users, whether the transactions be in their individual capacity or on behalf of their tenants, where these transactions include financial transactions (e.g., credit card transactions) involving third-party entities, such as gateways 240, gateway adapters 237, etc.

In one embodiment, idempotency may be applied to or implemented on one or more entities, such as transaction platform 230, gateways 240, etc., to that any potentially duplicate requests are thwarted. It is contemplated that not all of gateways 240 may be capable of having or offering idempotency support, while some of gateways 240 may choose not to have any idempotency support or participate in any idempotency-based techniques. For example, as illustrated, gateways 1 313, 2 315, 3 317 are participating gateways 311, while gateways 4 323, gateway N 325 are regarded as non-participating gateways 321. Identifying any real-life gateways by their trademark names would be beyond the scope of this disclosure and that it is contemplated that embodiments are not limited to any specific number or types of gateways.

As facilitated by request and key reception logic 213 of transaction evaluation and processing engine 211, a request is received from a user via one or more of tools and interfaces 222 and communication logic 224 of client device 130A over one or more of communication network(s) 135. This request may be placed to facilitate a financial transaction, such as payment for an item, such as a product or a service, where the financial transaction is to be processed through one or more of gateways 240 and their corresponding one or more of gateway adapters 237.

In one embodiment, the request submitted by the user may also include an idempotency key for facilitating idempotency to assure that the transaction is processed merely once, as intended. For example, idempotency refers to a property of certain operations that require merely one instance to perform or to take the request (triggered by an operation) to completion and that multiple attempts at causing the operation may not be of any consequence. For example, an operation in mathematics, functional programming, computer science, etc., may be applied multiple times without altering the result which would have been obtained with just the initial act or application. Examples of such operations include elevator buttons, traffic crossing buttons, etc., which are triggered at the first pressing of the button and that any subsequent attempts do not alter the results.

For example, an idempotent HTTP method may be called several times producing the same outcome, such as the outcome would not matter whether the method is called one or a thousand times. Stated differently, the result/outcome of a successfully performed request is independent of the number of times the request is made or executed, such as in arithmetic, adding zero to a number is an idempotent operation. Further, for example, a request method is considered idempotent if the intended impact on the server of multiple identical requests with that method remains the same as it would have been for a single request. Examples of such request methods include PUT, DELETE, etc.

Referring again to the foregoing request received or detected by request and key reception logic 213, as mentioned above, the request send by the user, via client device 130A, may already include an idempotent key that is unique to the user. This idempotent key may be included in the request as part of a header of the request, or be simply included in the body of the request, etc. As will be further discussed later in this document, in one embodiment, this idempotency key/ID, upon closer review by validation and registration logic 215, may reveal pertinent information, such as whether the request has been previously made or processed. In one embodiment, a request having the same idempotency as a previous request may be regarded as duplicate of the previous request. For example, each request include a unique idempotency key and therefore, in one embodiment, two or more requests having the same idempotency key are regarded as duplicate requests.

In one embodiment, a unique non-repeating idempotency key may be deterministic or non-deterministic, and if client device 130A uses an existing user ID from an entity that stores transaction requests, then that can also guarantee the idempotency key's uniqueness. Further, in some embodiments, client device 130A may also use Globally Unique Identifier (GUID) to generate a unique idempotency key and persist it for subsequent retries.

Further, validation and registration logic 215 determine whether the request is valid for further processing, such as whether the request and its contents are appropriate, whether the request, the user, client device 130A, etc., are authorized to place the request, etc. As facilitated by validation and registration logic 215, if the request is regarded as valid, it is then registered with transaction platform 230, and if the request is not valid, a descriptive error is thrown and communicated back to the user via client device 130A, as facilitated by communication and response logic 219.

If, for example, it is determined that request is a duplicate request and that it has been previously processed, as facilitated by validation and registration logic 215, then access and evaluation logic 217 may be triggered to access any available and pertinent data, such as at database(s) 140, to perform deeper evaluation of the request, such as whether the request was processed successfully, or is it retriable, etc.), etc., to determine its outcome. For example, if the request was previously processed, and processed successfully, then communication and response logic 219 simply communicate a previous (or the latest) result (such as the outcome of the same request's previous execution) back to the user to be accessed by the user using tools and interfaces 222 as facilitated by interface logic 221.

In those cases where the request is determined to be valid (include new request), in one embodiment, as will be further described with reference to FIG. 4A, the request may then be regarded valid and registered with transaction platform 230, as facilitated by validation and registration logic 215. This registration may allow for noting the processing details and any outcome of the request and in working with idempotency and retry matrix 225, such details are preserved through access and evaluation logic 217 and stored at database(s) 140. As discussed earlier, the outcome of this valid/new request and other pertinent processing details may then be used to detect and prevent any potential duplications of this request, based on idempotency.

It is to be noted and contemplated that embodiments are not necessarily limited to the arrangement shown or the flow of processes as illustrated with respect to FIG. 2 or discussed throughout this document. For example, embodiments are not limited to merely one server computer, such as computing device 120, and there may be occasions when one or more entities of FIG. 2 may fail where, for example, one or more requests may be paused without being fully processed.

For example, there may be a case where transaction platform 230 may receive a request (having an idempotency key/ID) from client device 130A and sends it over to a gateway of gateways 240 for processing. Now, for example, upon forwarding the request to the gateway, transaction platform 230, as supported by server computing device 120, may crash before obtaining the response to the request from the gateway. In this case, in one embodiment, validation and registration logic 215 may classify and hold the request as "PENDING" since the request was not processed to completion. Now, in some embodiments, another request, such as a second request, with the same idempotency key is received at another server computer, such as a second server computing device, hosting another transaction platform, such as a second transaction platform, where this second request is received such that the second server computer and the second transaction platform treats the previous request as PENDING that is not processed.

Now, to avoid this potential scenario in which a request may permanently remain in the PENDING state, in one embodiment, the second transaction platform, upon receiving the second request with the same idempotency key, checks to determine how long the previous request has been PENDING with the transaction platform 230. In one embodiment, an amount of time, such as a few minutes (e.g., time X), etc., may be regarded as the time threshold until which time the previous request may remain PENDING. In one embodiment, time X may be dynamic and flexible and configurable according to any given situation, such as system resources, gateway bandwidth, holiday traffic, etc. For example, if time X is configured to 3 minutes, the if the previous request meets this time threshold X of 3 minutes, such as the previous request is pending for 3 minutes since the crash, then the request may be regarded as indeterminate by the validation and registration logic of the second transaction platform and the previous request is terminated in favor of the second request. It is contemplated that embodiments are not limited as such and that in some embodiments, this time threshold X (e.g., 3 minutes), or another time threshold, such as a shorter time threshold of X' (e.g., 1 minute), may be triggered when the second request of the same idempotency key is received at the second transaction platform corresponding to the second server computer, etc.

As illustrated, in one embodiment, the various components, such as logic 213, 215, 217, 219, 221, of transaction evaluation and processing logic 211 may communicate and work with idempotency and matric engine 225 to ensure seamless applications of idempotency to user requests for financial transactions, based on any idempotency keys extracted from such requests and any pertinent data and/or metadata available at database(s) 140. Further, in one embodiment, as will be further described with respect to FIG. 4B, idempotency and retry matrix engine 225 may work with validation and registration logic 215 and/or access and evaluation logic 217 for maintenance and application of a retry matrix to such requests so that each request is evaluation and decided on its own merit in an organized and equitable manner.

Further, in one embodiment, interface logic 221 may be used to offer application programming interfaces (APIs), such as transaction gateway APIs, transaction gateway client APIs, apex layer APIs, apex transaction gateway adapter APIs, etc. In one embodiment, interface logic 221 may also offer uniform resource locators (URLs) at client device 130A for users to place queries, facilitate financial transactions, input parameters or data, initiate and facilitate communication with transaction platform 230 and gateways 240, etc.

As mentioned previously, it is contemplated that queries may include any number and type of requests seeking responses for processing jobs, running reports, seeking data, etc. These queries are typically placed by users on behalf of tenants, using client device 130A. It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from transactions control and management mechanism 110 to facilitate various embodiments including adding, removing, and/or enhancing certain features. It is contemplated that embodiments are not limited to any technology, topology, system, architecture, and/or standard and are dynamic enough to adopt and adapt to any future changes.

FIG. 3 illustrates an embodiment of an architecture 300 for prevention of duplication of financial transactions according to one embodiment. It is to be noted that for brevity, clarity, and ease of understanding, many of the components and processes described with respect to FIGS. 1-2 may not be repeated or discussed hereafter.

As illustrated, cloud-based transaction platform 230 (e.g., payment platform) is offered and supported by a service provider (e.g., Salesforce.com®) in communication with various entities, such as client device 130A, transaction gateways 240, apex layer 235 having transaction gateway adapters 237, etc., over one or more communication networks, such as network 135 of FIG. 1. Although this architecture 100 is discussed in view of multi-tenant database environment 100 of FIG. 1, it is contemplated that various entities, such as transaction platform 230, may be implemented separately as a cloud computing platform serving as an intermediary between sever computer 120 and other entities, such as gateways 240, or serve as an extension of server computer 120 of FIG. 2, etc.

Further, as previously described with reference to FIG. 2, transaction platform 230 may be a cloud-based platform having an extendable or pluggable architecture capable of, for example, integrating apex later 235 and its associated adapters 237, etc., such that the integrated components also fall within the framework of a service provider's core (e.g., Salesforce.com® core).

In one embodiment, transaction platform 230 is coupled to or in communication with a pluggable architecture that allows for hosting of various transaction gateways 240, such as gateway 1 313, gateway 2 315, gateway 3 317, gateway 4 323, gateway N 325, etc., along with their corresponding transaction gateway adapters 237, such as gateway adapter 1 371, gateway adapter 2 373, gateway adapter 3 375, gateway adapter 4 377, and gateway adapter N 379 as part of third-party apex managed packaged and exchange layer 235, etc.

In one embodiment, transaction platform 230 may invite gateways 240 to opt-in and participate in this idempotency-based service for prevention of duplication of transactions. It is contemplated that whether any of gateways 240 choose to participate or not is decided by and depends on their organizational and ownership entities. For example, as illustrated, gateways 313, 315, 317 have selected to opt-in and are regarded as participating gateways 311, while gateways 323, 325 have chosen not to participate and are regarded as non-participating gateways 321. It is contemplated that embodiments are not limited to opting-in for participating and simply not opting-in for not participating and that in some embodiments, not participating may involve opting-out, while participating may involve simply not opting-out.

As illustrated, client device 130A may be in communication with transaction platform 230, and with one or more gateways 240 through transaction platform 230. A user may place a transaction, such as a financial transaction including credit cards, debit cards, gift cards, rewards cards, digital wallets, mobile wallets, automated clearing house (ACH) payments, etc., with one or more of gateways 240 via transaction platform 230.

It is contemplated that transaction platform 230 may employ any number and type of commination and messaging techniques, such as a communications platform as a service (CPaaS) as a cloud-based delivery mode for allowing organizations to add real-time capabilities, such as video, voice, voice messaging, short message service (SMS), multimedia messaging service (MMS), telephony, etc. Further, transaction platform 230 may employ standards-based APIs, comprehensive developer's kits, APEX®, JAVA®, or other libraries for building applications on various platforms. For example, business core engine 303 may be based on JAVA® but it is contemplated and to be noted that embodiments are not limited as such. It is to be noted that APEX® is proprietary language developed by Salesforce.com® that allowed client devices, such as client device 130A, to communicate with and deliver functionality on top of Salesforce.com® platform, such as transaction platform 230. Any further discussion of details relating to messaging techniques, APEX®, JAVA®, etc., are beyond the scope of this disclosure.

As illustrated, transaction platform 230 offers a seamless communication and integration with any number and types of transaction gateways 240 by using and exposing transaction gateway adapter APIs 343 (e.g., APEX® transaction gateway adapter APIs) at transaction platform 230. Further, gateway adapter APIs 343 may be used to communicate through gateway adapters 237 through gateway adapter APIs 343 offering various forms of communication standards, such as authorization or verification 351, transaction 353 (e.g., buying, selling, etc.), transaction void, cancellation, or refund 355, transaction status 357, data communication 359, and callout 361, and/or the like. These are merely a few examples of communication between transaction platform 230 and gateway adapters 237 but that embodiments are not limited as such.

In one embodiment, gateways 240 correspond to gateway adapters 237, such as gateway 1 313 corresponding to gateway adapter 1 371, gateway 2 315 corresponding to gateway adapter 2 373, gateway 3 317 corresponding to gateway adapter 3 375, and so forth, through various APIs, such as gateway adapter APIs 343. As previously mentioned, embodiments are not limited to any number or types of gateways 240; however, examples of gateways 240 include one or more of AMAZON PAYMENTS®, FIRST DATA CORPORATION®, BLUEPAY PROCESSING®, PAYSIMPLE®, FASTCHARGE.COM®, PAYNOVA®, ADVEN®, WORLDPAY®, SECUREPAY.COM®, AUTHORIZE.NET®, 2CHECKOUT.COMCHRONOPAY®, SQUARE®, PAYPAL®, STRIPE®, CYBERSOURCE®, etc. Transaction gateways 240 (e.g., payment gateways) may be used to facilitates financial transactions, such as payment transaction, by the transfer of information between payment portals (such as websites, mobile phone applications, interactive voice response services, etc.) and front-end processors or acquiring banks or financial institutions. For example, any one of gateways 240 may serve as a payment gateway to facilitate communication between banks and help a merchant collect payments from a purchaser, or have a user make a credit card payment for a purchase of a product or a service offered by a merchant, etc.

Further, as illustrated, any number of users may access one or more tools and interfaces 222 offered through client-based cloud platform 301 at client device 130A for communication with gateways 240 for their financial transactions through transaction platform 230 via gateway client APIs 341. Any of these users may transact business through transaction platform 230, such as sales, purchases, returns, etc., using client device 130A, while client device 130A and gateways 240 remain in communication with but outside of transaction platform 230.

In one embodiment, gateway adapters 237 of apex layer 235 may be customized and/or integrated with transaction platform 230 to allow for gateways 240 to use a standardized APIs, such as APEX® gateway adapters APIs 343, to be able to manage for gateway adapters 237 to have their own package code for communication with their corresponding gateways 240. Similarly, client devices, such as client device 130A, may be given access to various gateway adapters 237 for gateways 240 so they may install them and initiate different payment gateway adapters 237 for selecting one or more of gateways 240.

In one embodiment, transaction platform 230 is a cloud-based transaction platform that includes user interfaces 331, transaction APIs 333, transaction schedulers 335, and transaction batch processes 337, etc., for performing and/or facilitating any number of tasks, communications, integrations, etc., where many of which are beyond the scope of this document and therefore not discussed here for the sake of brevity and clarity. For example, UIs 331 may include user interfaces for interacting with transaction APIs 333 and facilitating financial transactions, such as payment transactions, where APIs 333, like APIs 341, may include any number and type of application programming interfaces, such as Representational State Transfer (REST) APIs, Simple Object Access Protocol (SOAP) APIs, and APEX® APIs, etc., for client device 130A for interacting with transaction platform 230 for performing financial transactions and further with gateway client APIs 341 for transacting with gateways 240. For example, transaction gateway 1 313 (e.g., SQUARE®) may use the transaction gateway client APIs 341 to integrate with transaction platform 230 and implement transaction gateway adapter APIs 343, while the client device 130A may select to use any type transaction gateway client APIs 341, such as SOAP APIs, REST APIs, APEX® APIs, etc. As described with reference to FIG. 2, it is contemplated that transaction platform 230 may be part of or hosted by server computer 120 or offered as a transaction platform separate from server computer 120 to serve as an intermediary platform between server computer 120 of FIG. 2 and other pertinent entities, such as client device 130A, adapters 240, etc.

Further, as illustrated, transaction platform 230 hosting business core engine 303 including transaction evaluation and processing engine 211 having request and key reception logic 213, validation and registration logic 215, access and evaluation logic 217, communication and response logic 219, and interface logic 221 as further described with reference to FIG. 2. In one embodiment, business core engine 303 further includes idempotency and retry matrix engine 225, which in communication and collaboration with communication with transaction evaluation and processing engine 211, facilitates performance of tasks associated with applying and evaluating of financial transaction requests (e.g., payment requests, etc.) based on idempotency and in view of a retry matrix. Business core engine 303 further includes gateway client APIs 341 and gateway adapter APIs 343 to work with transaction evaluation and processing engine 211 and idempotency and retry matrix engine 225 to seamlessly facilitate and manage various transactions, interactions, and communications between various entities of architecture 300.

For example, as described with reference to FIG. 2, a user having access to client device 130A may place a request (such as a financial transaction request for payment for goods or services) using one or more tools and interfaces 222 offered through client-based cloud platform 301 at client device 130A. This request may then be detected and received by request and key reception logic 213, which further detects any idempotency key contained within the request. For example, the request may include an idempotency key that may then be used by validation and registration logic 215 for validation purposes.

Figure 4A:
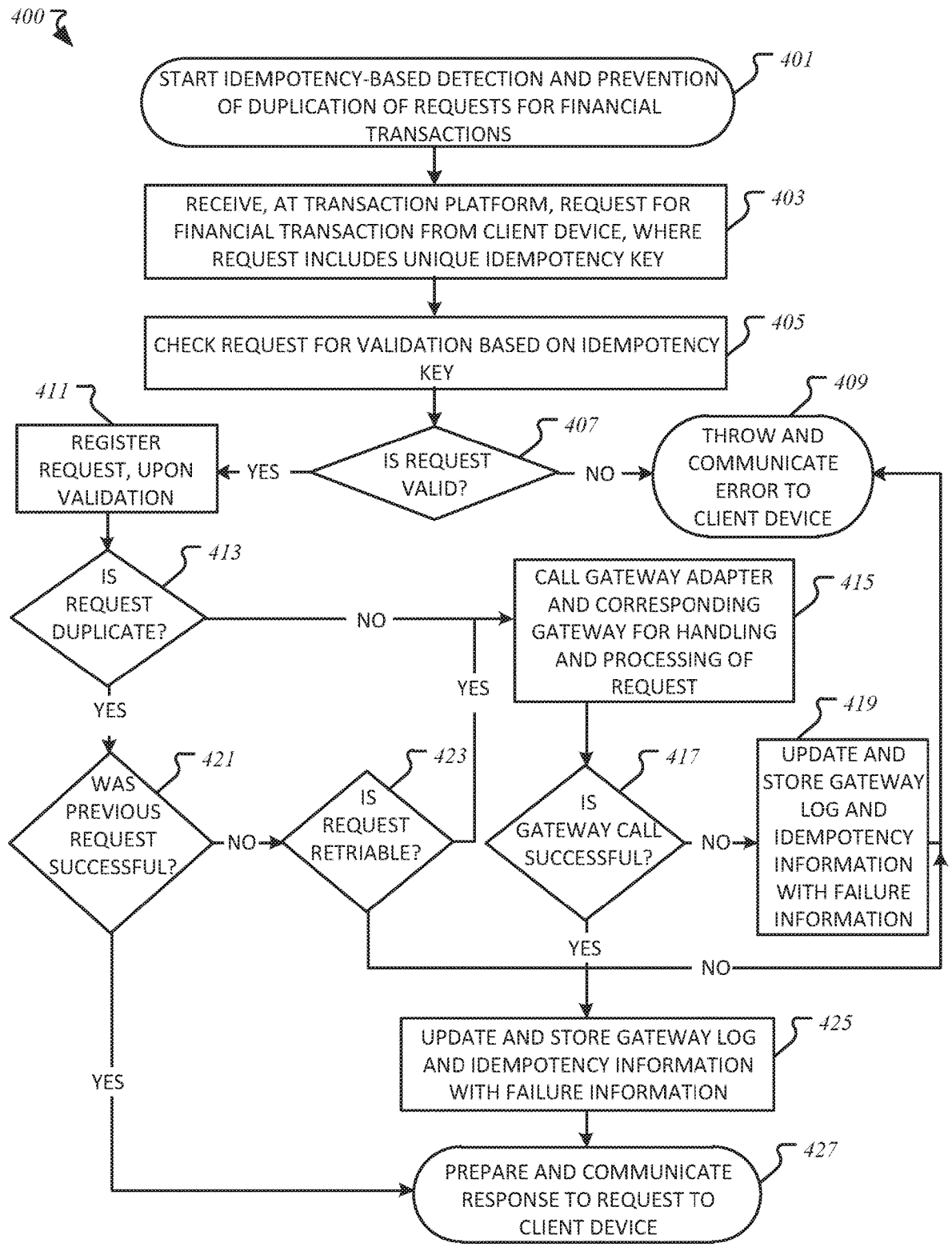
FIG. 4B illustrates a retry matrix according to one embodiment.

As will be further illustrated with respect to FIG. 4A, once the user, client device 130A, and the request are authenticated, the idempotency key and the principle of idempotency may be applied, as facilitated by idempotency and retry matrix engine 225 in collaboration with validation and registration logic to 215, to determine whether the request has been previously placed and, successfully or unsuccessfully processed, etc., and information, which allows validation and registration logic to 215 to further determine and conclude whether the request is valid or now, such as whether it is new or a potential duplicate. If the request is valid/new, it is then registered, as facilitated by validation and registration logic 215, and allowed for further processing through access and evaluation logic 217 and thereafter, as facilitated by communication and response logic 219, a response to the request generated and communicated back to the user at client device 130A through tools and interfaces 222.

If, however, the request is determined to be a repeat transaction, then, as further discussed with reference to FIGS. 4A and 4B, idempotency and retry matrix engine 225 is further triggered, in collaboration with access and evaluation logic 217, to take a deeper look at this potentially duplicate request (that could lead to duplicate payment for the same transaction, such as purchase of the same product or service that is paid for already). In one embodiment, this greater evaluation is performed in view of a retry matrix to further categorize the request, such as retriable, non-retriable, etc., while in some cases, the request may be retriable but due to other factors (such as non-participating gateways 321, system failure, timeouts, unexpected interrupts, etc.) the request may not be retried.

Once the request is classified in whichever category that is most applicable to or appropriate for this request, it is then handled accordingly through access and evaluation logic 217 and communication and response logic 219. For example, if the request has been previously successfully processed, then communication and response logic 219 may prevent the re-processing or duplication of the same request and simply forward a previous response to the user via client device 130A.

As previously described with reference to FIG. 2, embodiments are not limited to architecture/system 300 and that for example, there may be multiple sever computers and their corresponding transaction platforms to take over processing of requests from one another upon failures, crashes, etc. For example, as discussed with reference to FIG. 2, a time threshold (X) may be assigned to request in case a request with an idempotency key is stuck in the process queue (such as due to the crash or failure of transaction platform 230, etc.) and is termed PENDING, while another request with the same idempotency key is received at a second transaction platform associated with a second server computer. In this case, in one embodiment, the first request may be terminated upon reaching a given time threshold (e.g., 120 seconds) in the PENDING state, while the second transaction platform takes over and processed the second request with the same idempotency key.

FIG. 4A illustrates a method 400 for facilitating idempotency-based prevention duplication of financial transactions according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of transactions control and management mechanism 110 of FIG. 1. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated or discussed hereafter.

Prior to discussing method 400, consider a financial transaction involving payment, where a user (e.g., buyer) send a request to an API with payment method details, such as credit card numbers, CVV, etc., to transfer an amount of money to a merchant. In such a case, a service provider (e.g., Salesforce.com®), being payment card industry (PCI)-compliant, facilitates the transaction with a participating gateway, while ensuring that the transaction is not duplicated, which could lead to the user paying more than once for the same transaction (e.g., purchase of product/service) and also overburden the overall system with a series of unnecessary transactions.

As previously discussed with reference to FIG. 2, based on conventional techniques, it is common for a user (e.g., customer, merchant, etc.) to be charged multiple times for the same transaction, where in many such cases, the transaction inadvertently requested and performed multiple times. Some of the scenarios for such duplications of transactions include: 1) a network error, such as if a server computer goes down without fulfilling a payment request and the client computer tries or retries the same request assuming the payment was not made, this could lead to multiple charges, which can also happens if the client computer fails before persisting the response received from the server computer; 2) an accidental retry, such as because of a bug on a client computer, a user may end up clicking the pertinent button (e.g., pay button, send button, submit button, etc.) or refreshing the webpage multiple times for the same transaction; 3) a bug or a rare condition of some sort, such as on the client side, that that end up sending the same payment request, programmatically or algorithmically; and/or the like.

Embodiments provide for a technique to use and apply idempotency to detect and prevent any potential duplication of financial transactions, such as payments, not only saving the users a great of inconvenience of dealing with multiple payments, but also making such transactions efficient and seamless for service providers, such as transaction gateways. As previously discussed, idempotency refers to a property of certain operations that require merely one instance to perform or to take the request (triggered by an operation) to completion and that multiple attempts at causing the operation may not be of any consequence. Stated differently, the result/outcome of a successfully performed request is independent of the number of times the request is made or executed, such as in arithmetic, adding zero to a number is an idempotent operation.

Referring to method 400, at block 401, idempotency-based prevention of duplication of financial transactions is triggered such that at block 403, in one embodiment, a user sends a request having a unique key (e.g., idempotency key), where this unique key may be communicated as part of a header or a body of the request. This request is placed by the user using a client computing device via a user interface, while the request is communicated over to a transaction platform at (or coupled to) a server computing device over a network (e.g., cloud network, etc.). Upon receiving the request at the transaction platform, at block 405, the requests is inspected for its contents, including the unique idempotency key, and validated.

At block 407, a determination is made as to whether the request is valid. This validation examination may involve one or more factors, such as whether the request, the user, the client device, etc., are authenticated or authorized, etc. For example, if the request is not valid for having invalid content (e.g., wrong gateway, wrong product/service, wrong credit card, etc.), mismatched idempotency key (e.g., not unique to the user, expired key, etc.), and/or the like, then the request is classified as invalid and a descriptive error is thrown at block 409, where this error is then communicated back to the user via the client device.

Referring to block 407, if, however, the request is regarded and classified as valid, then, at block 411, the request may be registered with the transaction platform. At block 413, a determination is made as to whether the request is a duplicate request (such being submitted again for a second time, or a third time, and so on). In one embodiment, each request includes and is associated with a unique idempotency key and if two or more requests include the same idempotency key, then any such requests that are subsequently submitted to the first request are regarded as duplicates. If the request is not a duplicate request, it is then regarded as a new request, and subsequently, at block 415, a gateway adapter (and a corresponding gateway) is called on for further processing of the request. At block 417, a determination is made as to whether the call to the gateway adapter (and its corresponding gateway) is successful. If the call is unsuccessful, at block 419, a gateway/request log and any idempotency information with respect to the request, the gateway adapter, and/or the gateway is updated at the transaction platform and stored at a database for future reference. Continuing with block 419, an appropriate and descriptive error may be thrown and communicated back to the user via the client device.

Referring to block 417, if the call is successful, at block 425, the gateway/request log is updated with the success information and submitted to be stored at the database for future reference, and while the request is sent to the gateway for processing, at block 427, an appropriate and descriptive response to the request is formed and communicated back to the user via the client device.

Referring to block 413, if the request is regarded as a duplicate request (e.g., submitted for at least a second time), at block 421, another determination is made as to whether when this request was previously submitted, was it successful then. Upon accessing any historical data at one or more databases, if the request was successfully processed the last time it was submitted, then, in one embodiment, an appropriate and descriptive response is prepared or, in another embodiment, a previous response (if still appropriate and descriptive) is extracted, and sent over to the user via the client device at block 427.

Referring to block 421, if, however, upon accessing any available information at one or more databases, it is determined that this request when previously submitted was unsuccessful, then another determination is made as to whether this request is retriable at block 423. In one embodiment, as further illustrated with respect to FIG. 4B, in applying a retry matrix and based on any historical information, if the request is determined to be non-retriable, then method 400 continues at block 409 with throwing an appropriate and descriptive error back to the user via the client device.

Referring to block 423, if, based on the retry matrix and any historical information, the request is classified as retriable, then method 400 continues with block 415 where a gateway adapter (and its corresponding gateway) are called on for retrying (such as further processing) of the request. As described earlier, method 400 continues on with another determination as to whether this call to the gateway adapter (and its corresponding gateway) is successful. If not, at block 419, the gateway/request log is updated at the transaction platform and stored at a database and, at block 409, an error is thrown and communicated back to the user via the client device. If the call is successful, then at block 425, the gateway/request log is updated with the retrial information about the request and any pertinent idempotency information about the request and this log is then stored at the database. At block 427, a response to this retried request is prepared and then communicated on to the user at the client device.

As previously discussed, transaction platform may use the gateway/request log at one or more databases for future references, such as to find out the status of any last calls made to a gateway. For example, an idempotency supported field may be added to a gateway, such as a payment gateway provider entity, for additional supporting data. Further, a request may be registered if it is valid and just before the execution of the request starts or, in some embodiments, extra data may be added to indicate whether a previous request filed at the validation phase.

Moreover, as illustrated with respect to FIG. 2, transaction platform may expose a gateway adapter API using which partners or entities to integrate with multiple gateways, exposing idempotency information to gateway adapter API. In this matter, each request may have or access at the following: idempotency key (null, in case not populated); and duplicate (true, if detected as a duplicate request). Further, idempotency key (or ID) may be placed in the header or the body of a request. For example, for in process calls, this may be set for the body, while for HTTP REST calls, this may be set in the header, such as HttpHeader key: sfdc-payments-idempotency-key, and Key for Request-Body: idempotencyKey.

Figure 4B:
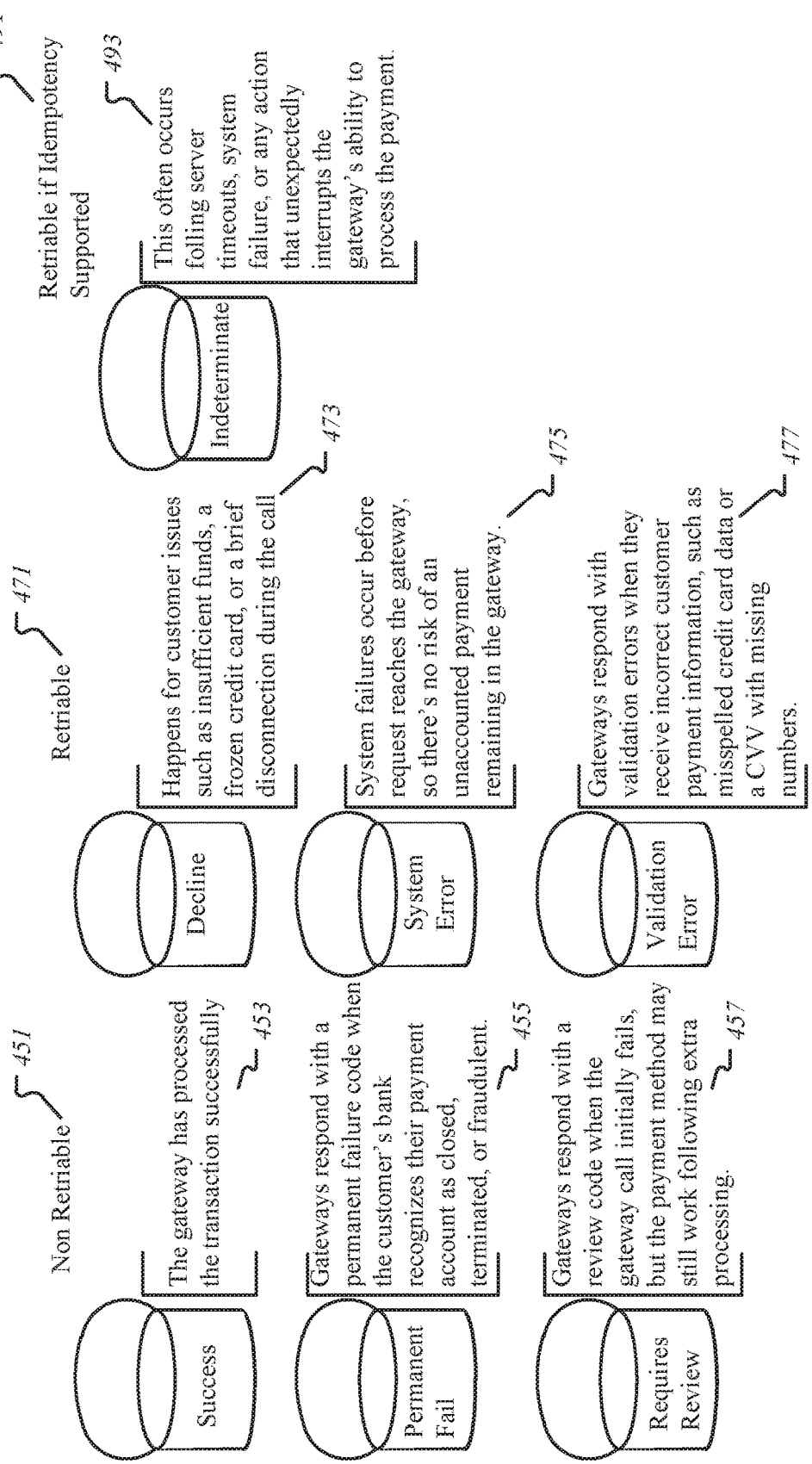

FIG. 4B illustrates a retry matrix 450 according to one embodiment. Retry matrix 450 may be used for idempotency-based processes as described with reference to FIG. 4A and as performed by processing logic that may comprise hardware (e.g., circuitry, dedicated logic, programmable logic, etc.), software (such as instructions run on a processing device), or a combination thereof. In one embodiment, any idempotency-based processes involving retry matrix 450 may be performed or facilitated by one or more components of transactions control and management mechanism 110 of FIG. 1. Any processes involving retry matrix 450 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4A may not be repeated or discussed hereafter.

In one embodiment, retry matrix 450 may offer multiple classifications of requests, such as non-retriable 451, retriable 471, and retriable if idempotency supported 491. As described previously, when a request with the same idempotency key is detected by transaction platform, that request may be regarded as a duplicate request. In one embodiment, this previous state of the request and retry matrix 450 may be used in conjunction to decide any subsequent processes as recited with respect to FIG. 4A. The following is an exemplary idempotency table relating to a request for a payment transaction:

|   | ColumnName | DataType | Nullable | Comments |
|---|---|---|---|---|
| 1 | IdempotentId | varchar2(255) | N | |
| 2 | InteractionType | STATICENUM | N | Type of Interaction with the gateway (Auth, Capture etc.) |
| 3 | State | STATICENUM | N | Indicates whether Pending or Completed |
| 4 | LastGatewayLog | FOREIGNKEY | Y | Last PaymentGatewayLog Id |

As illustrated, in one embodiment, a request may be classified as non-retriable 451 if, at 453, the request was previously processed successfully, such as when a gateway has processed the transaction associated with the request successfully, or if, at 455, the request fails permanently, such as when gateways respond with a permanent failure code, such as when a user's financial institution (e.g., bank) recognizes the user's account as closed, terminated, or fraudulent. Similarly, the request may be classified as non-retriable 451 if, at 457, the request requires review, such as when gateways response with a review code when a gateway call fails initially, the transaction may still work following some extra processing.

In one embodiment, a request may be classified as triable 471 if, at 473, the request is declined, such as when there are user issues due to one or more of insufficient funds, a frozen credit card, a brief disconnection during the call, etc., or if, at 475, the request encounters a system error, such as when a system failure occurs before a request reaches a gateway, so there is no risk of an unaccounted payment remaining in the gateway. Similarly, the request may be classified as non-retriable 471 if, at 477, the request encounters a validation error, such as when gateways respond with validation errors upon receiving incorrect user transaction information, such as misspelled credit card data, CVV with missing numbers, etc.

In one embodiment, a request may be classified as retriable if idempotency supported 491 if, at 493, the request is regarded as indeterminate, such as due to one or more of server timeout, system failure, and/or any action that can unexpectedly interrupt a gateway's ability to process the transaction.

Figure 5:
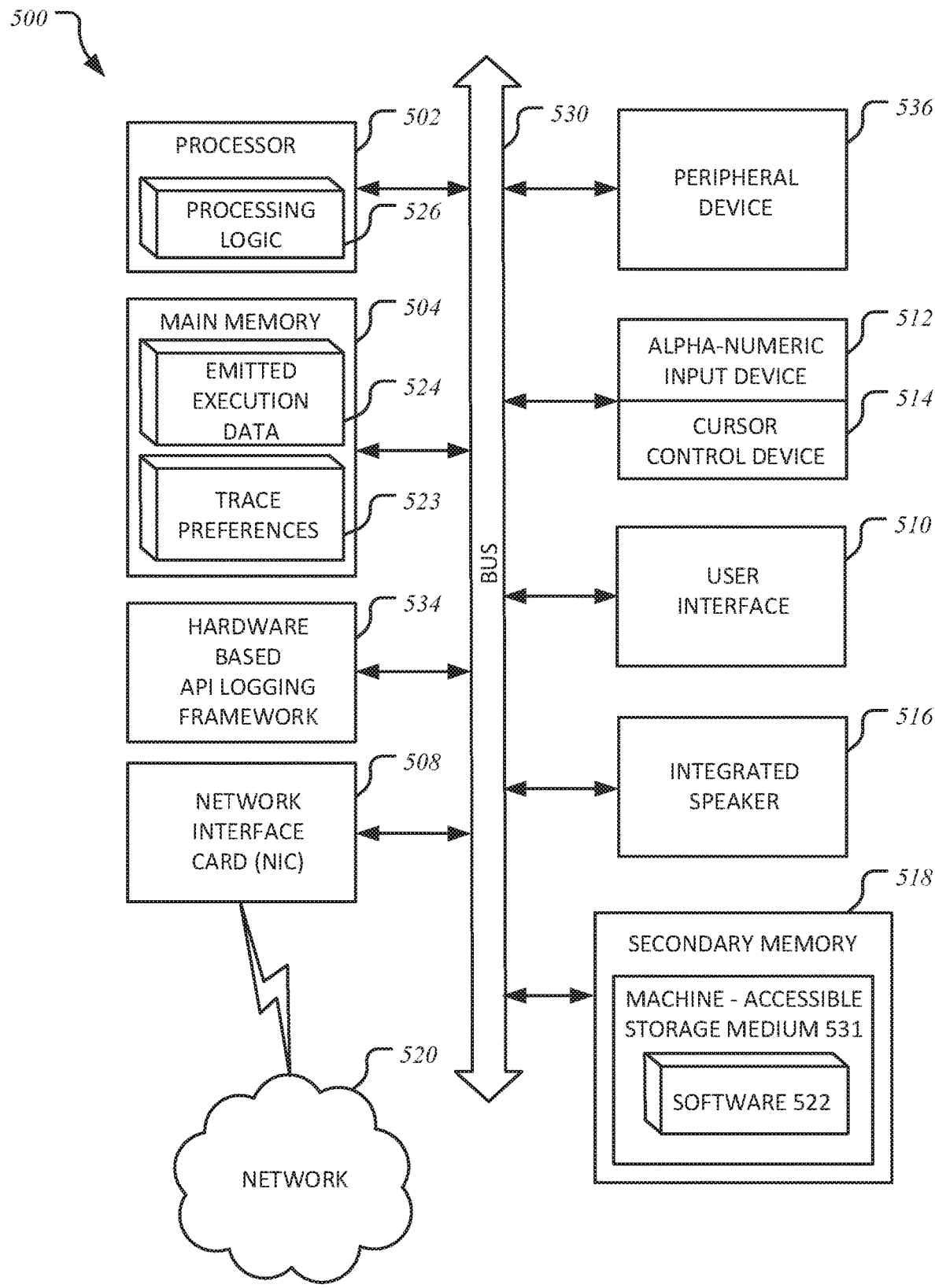
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of smart moderation/validation mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of smart moderation/validation mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
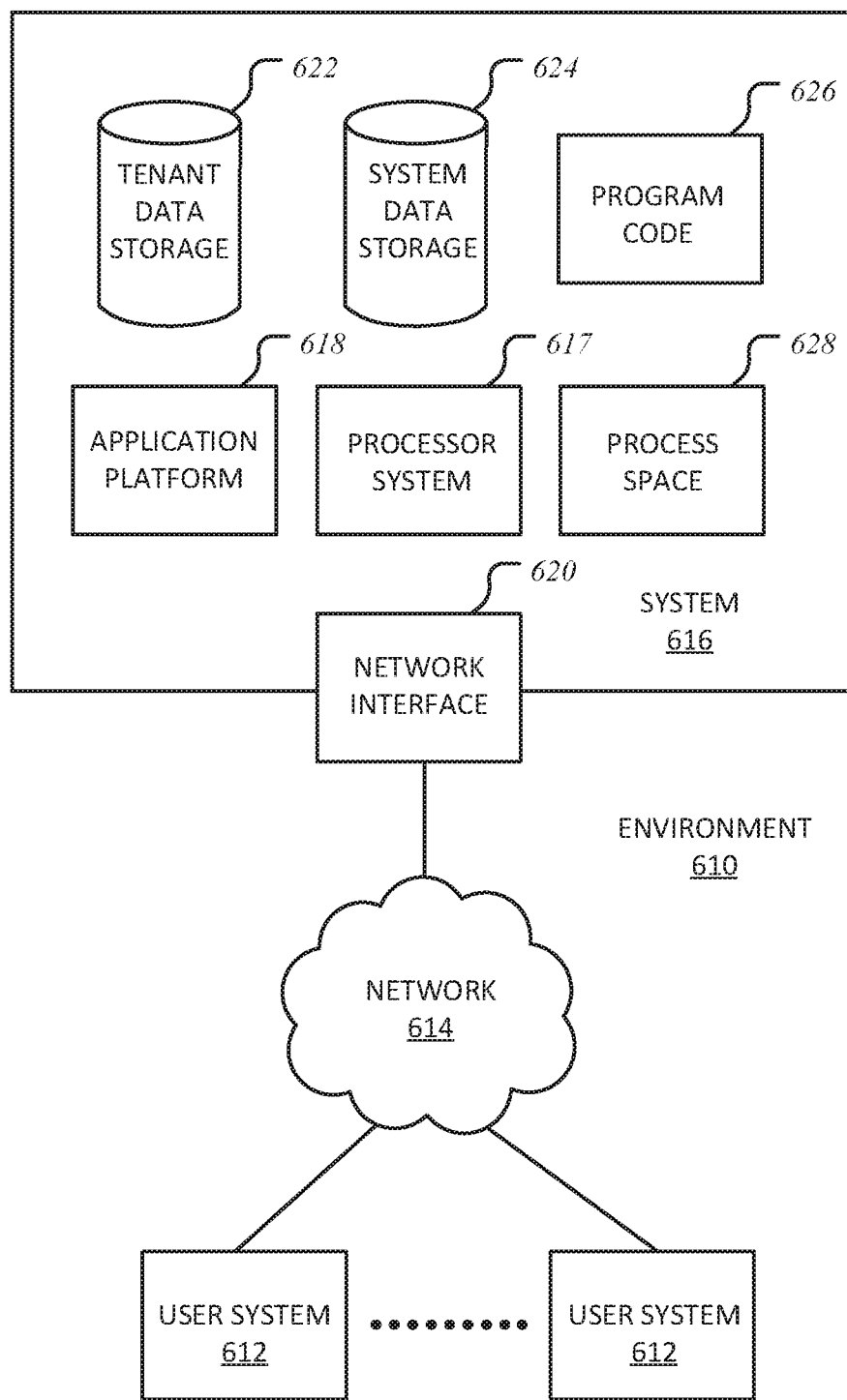
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third-party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 7:
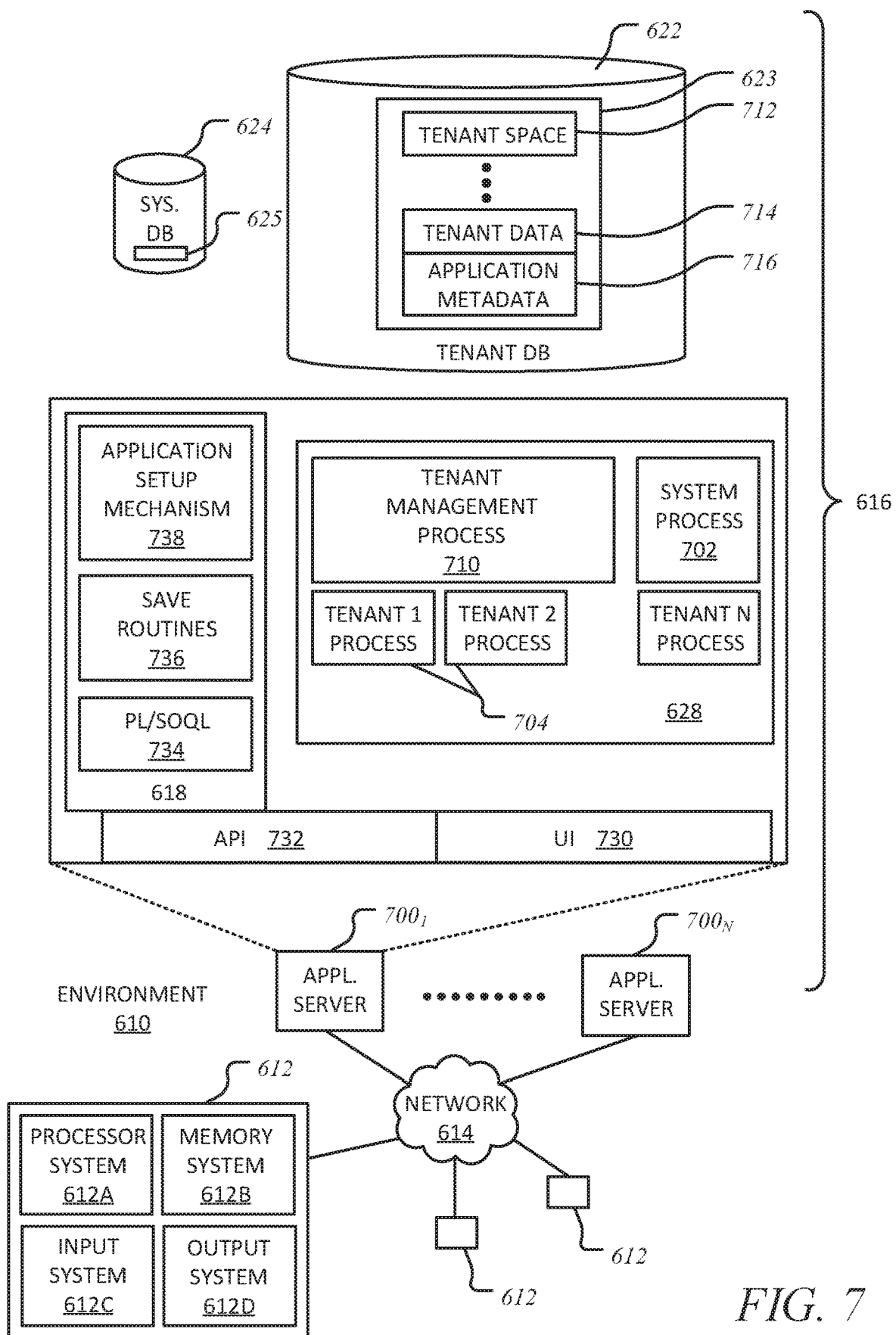
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items may be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process space 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multitenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method comprising:
receiving a request to facilitate a financial transaction, wherein the request is received from an external computing device and includes an idempotency key that is unique to the request;
verifying, based on the idempotency key, the request as being a valid request, wherein the valid request is registered;
determining, based on the idempotency key and a gateway log, that the valid request is a duplicate request that is an unsuccessful duplicate request, wherein the unsuccessful duplicate request is duplicate to a second previous request that was previously unsuccessfully processed;
responsive to determining that the request is an unsuccessful duplicate request,
determining, based on a retry matrix, whether the request is retriable for processing based on classifying the request as one of a retriable classification, a non-retriable classification, or a retriable if idempotency supported classification based on applying a first condition, a second condition, or a third condition to information from the processing of the request by a gateway, respectively, wherein the third condition is if the information is regarded as indeterminate based on an interruption in an ability to process the financial transaction by the gateway; and
if the request is classified in one of the retriable classification or the retriable if idempotency supported classification, calling on the gateway to execute the request.

2. The method of claim 1, the method further comprising:
if the request is classified in the non-retriable classification, throw an error and communicate the error back to the external computing device.

3. The method of claim 1, further comprising updating the gateway log and idempotency information based on the unsuccessful duplicate request, and storing the updated gateway log and the idempotency information at a storage entity, wherein the storage entity includes one or more of a database, a file-based system, and a distributed cache.

4. The method of claim 1, wherein, based on the retry matrix, the request classified as the duplicate unsuccessful request is classified in the retriable classification if the request was one or more of: a) at least once previously successful; b) subject to a permanent failure; or c) necessitates a review, and
wherein, based on the retry matrix, the request classified as the duplicate unsuccessful request is classified in the non-retriable classification if the request was one or more of: a) declined; b) subject to a system error; or c) subject to a validation error.

5. The method of claim 1, wherein if the request is classified as an original request, the method further comprising:
- calling on the gateway via a gateway adapter corresponding to the gateway to execute the request; and
- generating a response to the request based on execution of the request; and
- communicating the response to the external computing device over a communication network, wherein the external computing device includes a client computer.

6. The method of claim 5, wherein if the request is verified as an invalid request, the method comprising throwing an error and communicating the error back to the external computing device, and wherein the gateway includes a participating gateway that supports idempotency such that a transaction platform having access to metadata identifying a plurality of participating gateways supporting the idempotency selects the gateway to execute the request.

7. A database system comprising:
- a server computing device hosting a transaction platform coupled to one or more of gateways, gateway adapters, or a database, the transaction platform to facilitate operations comprising:
- receiving a request to facilitate a financial transaction, wherein the request is received from an external computing device and includes an idempotency key that is unique to the request;
- verifying, based on the idempotency key, the request as being a valid request, wherein the valid request is registered;
- determining, based on the idempotency key and a gateway log, that the valid request is a duplicate request that is an unsuccessful duplicate request, wherein the unsuccessful duplicate request is duplicate to a second previous request that was previously unsuccessfully processed;
- responsive to determining that the request is an unsuccessful duplicate request,
- determining, based on a retry matrix, whether the request is retriable for processing based on classifying the request as one of a retriable classification, a non-retriable classification, or a retriable if idempotency supported classification based on applying a first condition, a second condition, or a third condition to information from the processing of the request by a gateway, respectively, wherein the third condition is if the information is regarded as indeterminate based on an interruption in an ability to process the financial transaction by the gateway; and
- if the request is classified in one of the retriable classification or the retriable if idempotency supported classification, calling on the gateway to execute the request.

8. The method of claim 1, wherein, based on the retry matrix, the request classified as the retriable if idempotency supported classification if the request was determined to be indeterminate.

9. The database system of claim 7, wherein the operations further comprise updating the gateway log and idempotency information based on the unsuccessful duplicate request, and storing the updated gateway log and the idempotency information at a storage entity coupled to the transaction platform, wherein the storage entity includes one or more of the database, a file-based system, and a distributed cache.

10. The database system of claim 7, wherein, based on the retry matrix, the request classified as the duplicate unsuccessful request is classified in the retriable classification if the request was one or more of: a) at least once previously successful; b) subject to a permanent failure; or c) necessitates a review, and
- wherein, based on the retry matrix, the request classified as the duplicate unsuccessful request is classified in the non-retriable classification if the request was one or more of: a) declined; b) subject to a system error; or c) subject to a validation error.

11. The database system of claim 7, wherein if the request is classified as an original request, the operations further comprising:
- calling on the gateway via a gateway adapter corresponding to the gateway to execute the request; and
- generating a response to the request based on execution of the request; and
- communicating the response to the external computing device over a communication network, wherein the external computing device includes a client computer.

12. The database system of claim 11, wherein if the request is verified as an invalid request, further comprising throwing an error and communicating the error back to the external computing device, and wherein the gateway includes a participating gateway that supports idempotency such that the transaction platform having access to metadata identifying a plurality of participating gateways supporting the idempotency selects the gateway to execute the request.

13. A non-transitory computer-readable medium comprising a plurality of instructions which, when executed by a computing device, cause the computing device to facilitate operations comprising:
- receiving a request to facilitate a financial transaction, wherein the request is received from an external computing device and includes an idempotency key that is unique to the request;
- verifying, based on the idempotency key, the request as being a valid request, wherein the valid request is registered;
- determining, based on the idempotency key and a gateway log, that the valid request is a duplicate request that is an unsuccessful duplicate request, wherein the unsuccessful duplicate request is duplicate to a second previous request that was previously unsuccessfully processed;
- responsive to determining that the request is an unsuccessful duplicate request,
- determining, based on a retry matrix, whether the request is retriable for processing based on classifying the request as one of a retriable classification, a non-retriable classification, or a retriable if idempotency supported classification based on applying a first condition, a second condition, or a third condition to information from the processing of the request by a gateway, respectively, wherein the third condition is if the information is regarded as indeterminate based on an interruption in an ability to process the financial transaction by the gateway; and
- if the request is classified in one of the retriable classification or the retriable if idempotency supported classification, calling on the gateway to execute the request.

14. The database system of claim 7, wherein, based on the retry matrix, the request classified as the retriable if idempotency supported classification if the request was determined to be indeterminate.

15. The non-transitory computer-readable medium of claim 13, wherein the operations further comprise updating the gateway log and idempotency information based on the unsuccessful duplicate request, and storing the updated gateway log and the idempotency information at a storage entity coupled to the computing device, wherein the storage entity includes one or more of a database, a file-based system, and a distributed cache.

16. The non-transitory computer-readable medium of claim 13, wherein, based on the retry matrix, the request classified as the duplicate unsuccessful request is classified in the retriable classification if the request was one or more of: a) at least once previously successful; b) subject to a permanent failure; or c) necessitates a review, and
    wherein, based on the retry matrix, the request classified as the duplicate unsuccessful request is classified in the non-retriable classification if the request was one or more of: a) declined; b) subject to a system error; or c) subject to a validation error.

17. The non-transitory computer-readable medium of claim 13, wherein if the request is classified as an original request, further comprising:
    calling on the gateway via a gateway adapter corresponding to the gateway to execute the request;
    generating a response to the request based on execution of the request; and
    communicating the response to the external computing device over a communication network, wherein the external computing device includes a client computer.

18. The non-transitory computer-readable medium of claim 17, wherein if the request is verified as an invalid request, further comprising throwing an error and communicating the error back to the external computing device, and wherein the gateway includes a participating gateway that supports idempotency such that the computing device having access to metadata identifying a plurality of participating gateways supporting the idempotency selects the gateway to execute the request.

19. The non-transitory computer-readable medium of claim 13, wherein, based on the retry matrix, the request classified as the retriable if idempotency supported classification if the request was determined to be indeterminate.

* * * * *